United States Patent Office 3,143,441
Patented Aug. 4, 1964

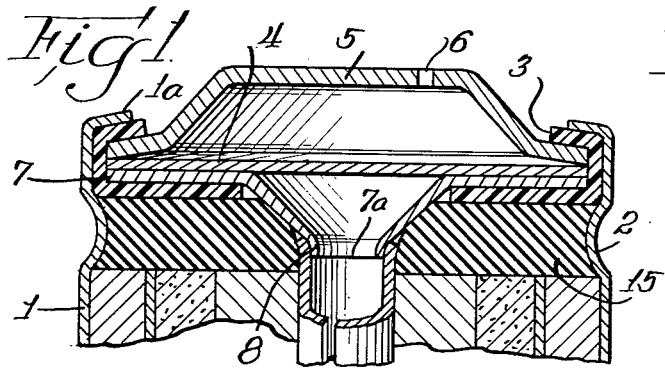
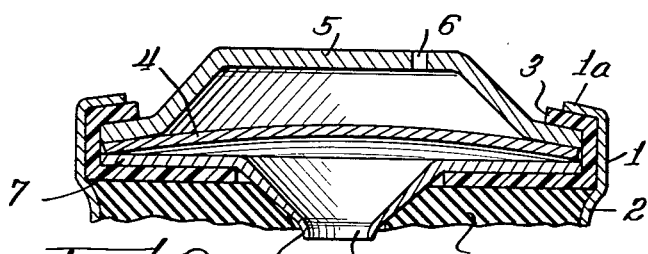
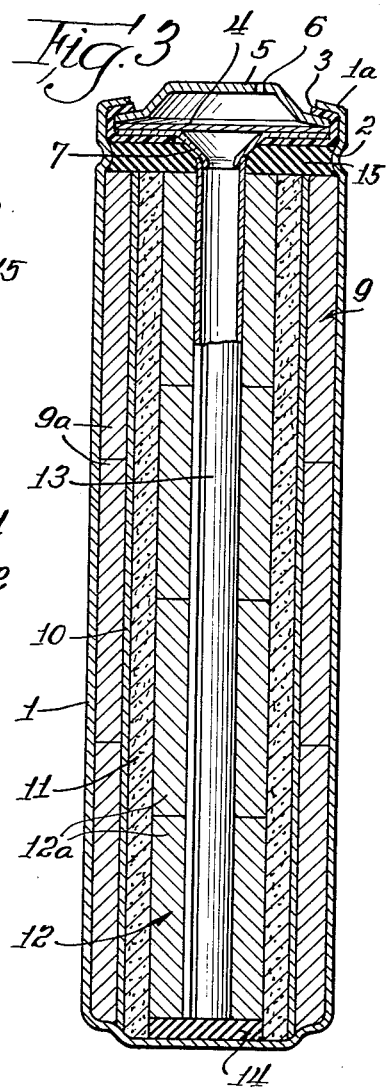
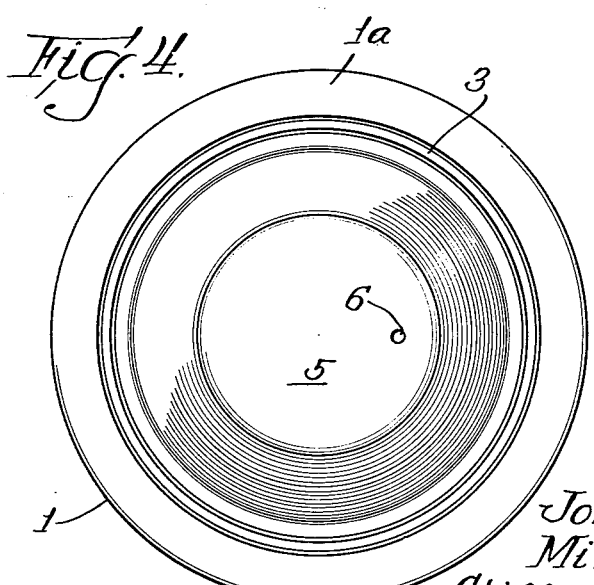

3,143,441
DIAPHRAGM VALVE FOR VENTING FLUID
Joseph J. Coleman, Milton E. Wilke, and Clifford J. Vander Yacht, Freeport, Ill., assignors to Servel, Inc., Evansville, Ind., a corporation of Delaware
Filed Dec. 29, 1961, Ser. No. 163,243
14 Claims. (Cl. 136—178)

This invention relates to a diaphragm valve adapted to remain in a hermetically sealed condition during normal operation of the device with which it is associated, but which permits the escape of fluid therethrough after a fluid pressure differential of predetermined value across the valve has been attained.

The invention more particularly relates to a diaphragm valve for air-tight or hermetically sealed enclosures for voltaic cells which permit the relief venting of gases formed within the cell when an abnormally high gas pressure has been built up within the cell enclosure.

Although the invention is applicable to all types of voltaic cells, it is especially suitable for use in the construction of containers for cells utilizing alkaline electrolyte, where gas formation resulting in excessive internal pressures is frequently encountered.

Various types of alkaline cells are currently in widespread use. The characteristics common to all is that they utilize an electrolyte comprised of an aqueous solution of an alkali metal hydroxide as for example potassium hydroxide. The alkaline cells may be further categorized as either primary cells or secondary cells. The primary alkaline cell most commonly used has a zinc anode, preferably in the form of amalgamated zinc powder, and a cathode or depolarizer member of a readily reducible metallic oxide such as manganese dioxide or mercuric oxide.

The most common of the secondary cells is the so-called nickel-cadmium cell. This cell utilizes an anode comprised of powdered cadmium metal and a cathode comprised of an oxide of nickel. Still another commercial alkaline cell utilizes amalgamated zinc powder as the anode and silver oxide as the cathode.

Alkaline cells have enjoyed wide public acceptance for a number of reasons. The primary alkaline cell offers a discharge capacity of as much as three or four times as great as that of traditional dry cells of comparable size. The secondary cell offers the prime advantage that, since the reactions which take place during discharge and recharge so nearly approach reversibility, the cells may be charged and discharged through a large number of cycles before they are rendered unusable. Both primary and secondary alkaline cells have a low uniform internal impedance during discharge, and consequently the voltage under current drain remains almost constant until the cell is exhausted. An additional advantage enjoyed by both types is that high discharge rates may be used without causing harm to the cell.

In order to be suitable for general commercial use, alkaline cells, both primary and secondary, must be provided with air-tight or hermetically sealed containers. There are several reasons for this requirement. First, the cells are often used in expensive electronic equipment, where any leakage of the cell electrolyte must be prevented. Second, the cells must be sealed from the atmosphere, since carbon dioxide normally present in the atmosphere would react with the alkaline electrolyte to produce carbonates, exhausting the electrolyte and reducing the useful life of the cell.

During certain phases of the normal operation of an alkaline cell, gases may develop therein. In the primary cell, gases may develop during the latter part of the discharge period, especially if the cells are over-discharged. Gases may also form during normal discharge if the discharge rate is excessive. In the secondary cell, gases may be formed during excessively high discharge or over-discharge. In addition, gases are normally generated during the latter part of the charge cycle and during over-charge. Although excessive over-charge is undesirable, a certain amount must be tolerated by the cell since it is generally not practical to determine the exact point of full charge and to stop the charging process exactly at that point.

Numerous venting means for hermetically sealed or air-tight cells have been disclosed in the prior art. In one type a closed crack or split is provided in the wall of the cell container, permitting the crack or split to rupture when the gas pressure becomes excessive. In another the cell wall is weakened at a point, enabling it to rupture at a predetermined gas pressure. In most cases, the means disclosed for venting gases may be characterized as emergency expedients and not adaptable for venting gases under normal continued use. Even where prior art means for venting gas under normal operating conditions have been disclosed, the means have not been susceptible of the necessary precision in predetermining the venting pressure.

It is an object of the invention to provide a valve for the controlled relief venting of fluids from an enclosure at a pressure which may be predetermined within precise limits.

It is further an object to provide a gas venting means for a voltaic cell enclosure which is relatively inexpensive and simple to construct.

It is further an object to provide a hermetically sealed voltaic cell enclosure having means for venting gases which have accumulated to form an abnormally high pressure, and wherein the sealed state is restored after sufficient gas has been vented to the atmosphere to reduce the internal cell pressure to a value below that of the venting pressure.

Other objects and advantages of the invention will become more apparent from the following description when taken in conjunction with the accompanying drawing in which:

FIG. 1 is an enlarged cross-sectional view of the fluid venting valve structure of the invention in normal position;

FIG. 2 is an enlarged cross-sectional view of the fluid venting valve structure in venting position;

FIG. 3 is a vertical cross-sectional view of a voltaic cell incorporating the valve structure; and FIG. 4 is a plan view of the top of the cell.

Referring to the drawing, the cell container is comprised of a steel cylindrical can 1 having a circular bead 2 provided near one end for supporting the closure structure. Above the bead is contained a sealing gasket 3 in the form of a flanged washer composed of a material such as nylon or neoprene. Within the sealing gasket is contained a resilient valve diaphragm 4, of a material such as spring steel, a rigid terminal cap 5 having a venting aperture 6 at its upper surface, and a rigid contact disc 7. The terminal cap 5 is comprised of a substantially rigid material such as sheet steel. The periphery of the cap 5 is in contact engagement with the periphery of the diaphragm 4 and is of substantially the same diameter. The central portion of the cap 5 is domed externally away from the diaphragm to permit the central portion of the diaphragm to bow into the space therebetween without resistance. The contact disc 7 makes electrical contact with the periphery of the diaphragm 4 and, by means of a central portion protruding downward, provides electrical contact with the anode structure of the cell. A venting aperture 7a is provided to permit gases to enter the space enclosed between the contact disc and the diaphragm 4. The sealing gasket 3 is compressed radially between the edge of the diaphragm and the adjacent portion of the wall of the steel can. Positioned in close electrical contact with the can 1 is a cylindrical depolarizer cathode 9. To promote ease of assembly, the cathode 9 is formed from a plurality of separately molded sleeve segments 9a which are individually inserted into the can.

A thin barrier membrane 10 is positioned at the inner surface of the tubular cathode to prevent the cathode material from migrating to the interior portion of the cell. Within the barrier membrane 10 is a tubular separator 11 composed of a bibulous material such as webril. The major proportion of the cell electrolyte is contained in the separator.

A tubular anode 12 is contained within the separator. The anode is comprised preferably of powdered metal molded under pressure in the form of short tube 12a. A plurality of the tubes are inserted into the central portion of the cell.

In order to provide good electrical contact between the segments of the anode, and the external terminal of the cell, a contact spring member 13 is inserted inside the anode. In the form shown, the contact spring member is a split tube commonly termed a "roll pin." In order to provide good contact, the outer diameter of the roll pin should be slightly larger than the inner diameter of the anode, so that a constant outward radial force is exerted by the roll pin against the anode. The roll pin is in contact engagement with the contact disc 7, the constricted end 8 of the contact disc being so designed that it may be inserted into the axial channel of the roll pin. An insulating disc 14 preferably of a resilient material such as neoprene both insulates the roll pin from the bottom of the can 1, and provides an upward axial force urging the roll pin against the contact disc 7. A second insulating disc 15 separates the cell elements from the closure structure.

The material used for forming the cathode may be any one of the easily reducible metal oxides commonly used in the battery art, such as manganese oxide, mecuric oxide, silver oxide, copper oxide or an oxide of nickel. When relatively non-conductive materials are used, as for example manganese dioxide or mercuric oxide, a minor proportion of a conductive material such as graphite or a carbon black such as acetylene black must be added in order to increase the conductivity of the depolarizing mixture. Silver oxide is generally in itself sufficiently conductive so that additional conductive materials need not be added. Suitable depolarizer compositions may be prepared by mixing together about nine parts manganese dioxide and about one part finely divided graphite, or about ten parts mercuric oxide and one part graphite. In the case of the nickel-cadmium cell, powdered metallic nickel may be added to the oxide in order to increase conductivity. The depolarizer mixture is preferably molded under pressure to the desired form. Where a tubular cathode is to be utilized, it has been found convenient to mold the cathode in the form of a plurality of tubes which are individually inserted, as shown in the drawing. The outer diameter of the depolarizer tubes should be so chosen that a tight press fit will result when they are inserted into the can 1, so that good electrical contact between the cathode and the can will result.

The function of the barrier member 10 is to prevent depolarizer particles from migrating to the central portion of the cell and thereby causing a short circuit. It must be composed of a material which is sufficiently resistant to the electrolyte so that it will not be decomposed, and yet must be sufficiently permeable so that the electrolyte may pass freely therethrough. Suitable barrier materials are parchment paper, sodium carboxymethylcellulose, porous polymeric films of a material such as vinyl chloride, and other suitable barrier materials which are known to the art.

The bibulous separator 11 may be composed of any electrolyte-absorbent material which is not adversely affected thereby. A suitable material is webril, a non-woven fabric made by blending thermoplastic fibers into a cotton web and applying heat and pressure.

The electrolyte may be chosen from among any of those suitable for the particular electrochemical system used. A preferred alkaline electrolyte has the following composition:

| | Percent |
|---|---|
| KOH | 28 |
| ZnO | 6 |
| $H_2O$ | 66 |

The zinc oxide component is utilized only where the anode is comprised of zinc. Its function is that of an inhibiting agent to protect the zinc anode from excessive dissolution in the electrolyte, especially during the period when no current is being drawn from the cell.

The anode is composed of an electronegative metal. In the mercury, manganese dioxide, and silver cells, zinc is the preferred anodic metal. The anode may be fabricated by placing the metal in the form of amalgamated powder into molds of a desired size and shape, and molding the structure under pressure. In the case of a nickel-cadmium cell, the anode is comprised of powdered cadmium or, alternatively, cadmium oxide, when the cell is assembled in the discharged state.

One of several methods may be used for assembling the cell shown in the drawing. In one method the end of the can is first flared outwardly to form a flange so that the end portion has a diameter somewhat greater than that of the remaining portion of the can. The active cell ingredients are first inserted in the normal manner. The closure, comprised of the nylon gasket 3, the contact disc 7, the diaphragm 4, and the metal cap 5 are then inserted into the enlarged portion of the cell. The upper lip of the can is then rolled over to retain the closure members. The can is finally drawn through a forming tool having a hole with a diameter only sufficiently great to permit the unflared portion of the can to pass freely through. As the entire can is forced through the hole, the flared portion is compressed radially inward with sufficient clamping force to provide a tight seal between the can 1, the sealing gasket 3, and the diaphragm 4. The closure structure is retained between the rolled over lip of the can and the circular groove or bead which results when the flange is drawn through the hole of the forming tool.

Alternatively, a can of uniform diameter may be utilized, a bead rolled into the can wall above the upper limit of the active elements in such a manner as to act as a lower support for the closure. The closure elements are then inserted and the rim of the can rolled thereover to provide clamping force against the gasket and diaphragm.

The fluid venting valve according to the invention operates in the following manner: Under normal conditions the diaphragm 4, which is preferably composed of a thin resilient spring metal sheet, preferably of spring steel, rests in substantially flat position and its edge is in sealing engagement with the sealing gasket 3. An air-tight or hermetic seal is thus provided. Under conditions where a fluid pressure differential forms between the two sides of the diaphragm, as for example, when gas is generated in a voltaic cell, the resultant force against the diaphragm 4 urges it outwardly. Since the edge of the rigid cap 5 limits axial movement of the edge of the venting disc, only the central portion of the diaphragm is able to bow outwardly. This results in a decrease in the effective diameter of the diaphragm, causing its edge to recede a short distance radially. As a result the seal between the disc and the sealing gasket 3 is weakened, and, when sufficient retraction takes place, the seal is broken and a quantity of gas is permitted to vent to the atmosphere. The venting continues until the diminished pressure once again permits the sealing disc to engage the gasket and re-establish a hermetic seal.

Although the invention has been described in detail in relation to only relatively few specific embodiments, it is to be understood that many variations may be practiced by those skilled in the art without departing from the spirit or scope thereof, within the limits defined by the appended claims.

Invention is claimed as follows:

1. A hermetically sealed fluid valve for an enclosure opening comprising a resilient spring-metal diaphragm, a rigid terminal cap having its periphery in contact engagement with the periphery of said diaphragm and its central portion spaced apart from the central portion of said diaphragm to permit said diaphragm to bow into the space therebetween, said terminal cap having an aperture provided therein to permit the passage of fluid therethrough, a sealing gasket of a sealable material disposed in sealing engagement over the edges of both said diaphragm and said terminal cap, and means associated with said enclosure opening for sealingly clamping said gasket radially against the edges of said diaphragm and said terminal cap, the arrangement being such that said opening is caused to be hermetically sealed under normal conditions, and whereby a pressure differential which develops between the two sides of said diaphragm of a predetermined magnitude causes said diaphragm to bow and its edge to recede from said gasket while said gasket is restrained in position by the edge of said terminal cap, thus breaking the seal and permitting fluid to flow between said diaphragm and said gasket and causing said pressure differential to be reduced, whereupon said seal is re-established.

2. A valve according to claim 1 wherein said sealing gasket is composed of nylon.

3. A hermetically sealed fluid valve according to claim 1 wherein said diaphragm is composed of spring steel.

4. In a voltaic cell comprising a container including therein electrodes consisting of a cathode and an anode, a bibulous separator interposed between said anode and said cathode having cell electrolyte absorbed therein, the improvement which comprises a hermetically sealed closure permitting venting of gas from said cell at a pre-determined pressure, said closure comprising a resilient spring metal diaphragm, a rigid electrically conductive terminal cap having its periphery in contact engagement with the periphery of said diaphragm and its central portion spaced apart from the central portion of said diaphragm to permit said diaphragm to bow into the space therebetween, said terminal cap having an aperture therein to permit the passage of gas therethrough, means for establishing electrical connection between said diaphragm and one of said electrodes, a sealing gasket of an electrically non-conductive sealable material disposed in sealing engagement over the edges of both said diaphragm and said terminal cap, the open end of said cell container being arranged for clamping said gasket radially against the edges of said diaphragm and said terminal cap, the arrangement being such that said cell is normally in a hermetically sealed condition, and whereby gas pressure developed within said cell of a predetermined magnitude causes said diaphragm to bow outwardly and its edge to recede from said gasket while said gasket is restrained in position by the edge of said terminal cap, thus breaking the seal between said diaphragm and said gasket and permitting gas to flow out of said cell until the gas pressure within the cell has again been reduced sufficiently to reestablish the seal.

5. A voltaic cell according to claim 4 wherein said sealing gasket is composed of nylon and said diaphragm is composed of spring steel.

6. A voltaic cell according to claim 4 wherein said means for establishing electrical connection between said diaphragm and one of said electrodes comprises a rigid electrically conductive contact member having only its periphery in electrical contact engagement with the periphery of said diaphragm, and having its central portion spaced apart from the central portion of said diaphragm, said contact member having an aperture therein for permitting the passage of gas therethrough and having its central portion electrically connected to one of said electrodes.

7. In an alkaline primary cell comprising a cylindrical metallic can including therein electrodes consisting of a cathode and an anode, a bibulous separator interposed between said anode and said cathode having an alkaline electrolyte absorbed therein, the improvement which comprises a hermetically sealed closure for said can permitting venting of gases from said cell at a pre-determined pressure, said closure comprising a resilient spring steel disc-form diaphragm, a rigid electrically conductive metallic terminal cap having its periphery in electrical contact engagement with the periphery of said diaphragm and its central portion domed outwardly with respect to said cell and spaced apart from the central portion of said diaphragm to permit said diaphragm to bow into the space therebetween, said terminal cap having an aperture therein to permit the passage of gas therethrough, a rigid electrically conductive contact member having its periphery in electrical contact engagement with the periphery of said diaphragm and its central portion domed inwardly with respect to said cell and having an aperture therein for permitting the passage of gas therethrough, the domed portion of said contact member being electrically connected to one of said electrodes, a sealing gasket of an electrically non-conductive sealable material disposed in sealing engagement over the edges of said diaphragm and said terminal cap, said gasket being clamped radially between the open end of said can and the edges of said diaphragm and said terminal cap, the arrangement being such that said cell is normally in a hermetically sealed condition, and whereby gas pressure developed within said cell of a pre-determined magnitude causes said diaphragm to bow outwardly and its edge to recede from said gasket while said gasket is restrained in position by the edge of said terminal cap, thus breaking the seal between said diaphragm and said gasket and permitting gas to flow out of said cell until the gas pressure within said cell has been sufficiently reduced to reestablish the seal.

8. A primary cell according to claim 7 wherein the normal diameters of said terminal cap, said diaphragm and said contact member are substantially the same.

9. A primary cell according to claim 7 wherein said gasket is composed of nylon.

10. A primary cell according to claim 7 wherein said cathode is comprised of manganese dioxide and said anode is comprised of zinc.

11. A primary cell according to claim 7 wherein said cathode is comprised of mercuric oxide and said anode is comprised of zinc.

12. In an alkaline secondary cell comprising a cylindrical metallic can including therein electrodes consisting of a cathode and an anode, a bibulous separator interposed between said anode and said cathode having an alkaline electrolyte absorbed therein, the improvement which comprises a hermetically sealed closure for said can permitting venting of gases from said cell at a predetermined pressure, said closure comprising a resilient spring steel disc-form diaphragm, a rigid electrically conductive metallic terminal cap having its periphery in electrical contact engagement with the periphery of said diaphragm and its central portion domed outwardly with respect to said cell and spaced apart from the central portion of said diaphragm to permit said diaphragm to bow into the space therebetween, said terminal cap having an aperture therein to permit the passage of gas therethrough, a rigid electrically conductive contact member having its periphery in electrical contact engagement with the periphery of said diaphragm and its central portion domed inwardly with respect to said cell and having an aperture therein for permitting the passage of gas therethrough, the domed portion of said contact member being electrically connected to one of said electrodes, a sealing gasket of an electrically non-conductive sealable material disposed in sealing engagement over the edges of said diaphragm and said terminal cap, said gasket being clamped radially between the open end of said can and the edges of said diaphragm and said terminal cap, the arrangement being such that said cell is normally in a hermetically sealed condition, and whereby gas pressure developed within said cell of a predetermined magnitude causes said diaphragm to bow outwardly and its edge to recede from said gasket while said gasket is restrained in position by the edge of said terminal cap, thus breaking the seal between said diaphragm and said gasket and permitting gas to flow out of said cell until the gas pressure within said cell has once again been sufficiently reduced to re-establish the seal.

13. An alkaline secondary cell according to claim 12 wherein said cathode is comprised of silver oxide and said anode is comprised of zinc.

14. An alkaline secondary cell according to claim 12 wherein said cathode is comprised of an oxide of nickel and said anode is comprised of cadmium.

References Cited in the file of this patent

UNITED STATES PATENTS

| | | |
|---|---|---|
| 2,163,262 | Rhodes | June 20, 1939 |
| 2,881,368 | Hancock | Apr. 7, 1959 |
| 2,971,045 | August | Feb. 7, 1961 |